Figure 1:
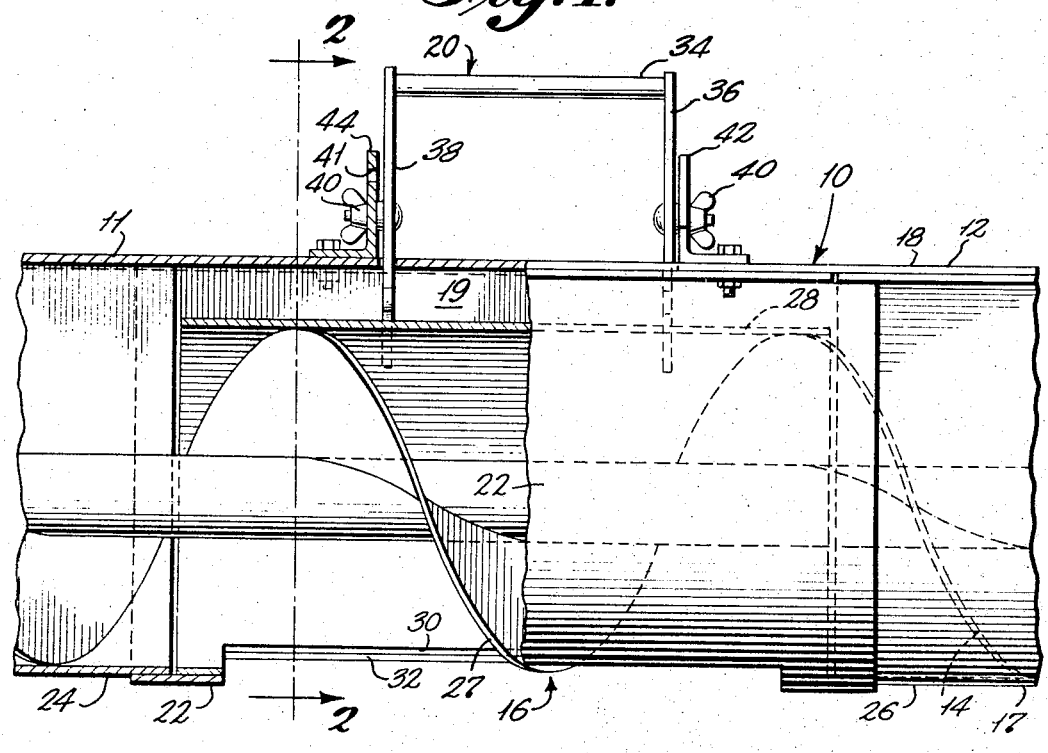

Sept. 19, 1967   C. S. GODLEY   3,342,315
DEVICE FOR DISCHARGING MATERIAL FROM A SCREW CONVEYOR
Filed Aug. 20, 1965

United States Patent Office 3,342,315
Patented Sept. 19, 1967

3,342,315
DEVICE FOR DISCHARGING MATERIAL FROM A SCREW CONVEYOR
Charles S. Godley, Hobbs, N. Mex., assignor to International Minerals & Chemical Corporation, a corporation of New York
Filed Aug. 20, 1965, Ser. No. 481,243
5 Claims. (Cl. 198—213)

This invention relates generally to a device for controlling the discharge of material from a screw conveyor. More specifically, it concerns a mechanism incorporating a rotatable closure member for selectively adjusting the discharge rate of material from a transverse opening in the case of a screw conveyor.

Screw conveyors are often used in industrial processes involving, for example, the transfer of granular material from a delivery point to bins or other storage areas. Frequently at the delivery point a hopper is positioned for receiving the granular material directly from the material-producing apparatus. The material must then be transferred from the hopper, to storage or curing bins for some period of time before it is removed for further processing or distribution. Screw conveyors provide an efficient means of transporting the granular material from the hopper to the selected bins. The discharge of material from the conveyor into a particular bin is usually controlled by a device affixed to the conveyor case which will permit selective adjustment of the discharge rate of material into the selected bin.

One frequently occurring problem with the usual conveyor discharge mechanism is that the corrosive action of the conveyed material tends to freeze the moving parts of the device so that adjustment of the discharge rate becomes difficult. Another problem often encountered is that of non-uniform distribution of the material between a plurality of bins caused by large lumps of the material, which have not been completely granulated in the production process, becoming wedged in the exit ports of one or more of a series of discharge devices.

With these problems in mind, the device of this invention provides a simple and inexpensive mechanism which avoids any tendency of the rotatable closure member to freeze in one position due to the corrosive nature of the conveyed material. The construction of the device also precludes any clogging of the discharge openings by large lumps of ungranulated material.

Furthermore, the device of the present invention conforms to the curvature of the conveyor case and occupies only a minimum of space externally of the case. Thus, if desired, a delivery chute may be connected directly to the conveyor case at the discharge station without hampering the operational effectiveness of the discharge device.

These and other advantages are achieved by positioning a rotatable sleeve within a housing member affixed to the conveyor case at a point where a length of the case has been cut away, which sleeve closely surrounds the rotating conveyor screw. The sleeve and housing member are formed with similar transverse discharge outlets. Upon rotation of the sleeve about the screw, these outlets may be aligned for discharging material from the path of the conveyor. The rotating sleeve is essentially self-cleaning because of its close adjacency to the rotating screw, thus preventing a build-up of corrosive material which would tend to freeze the rotating sleeve in a fixed position. In addition, since the sleeve closely surrounds the periphery of the screw, large ungranulated lumps of material are broken up between the rotating screw and the wall of the sleeve, precluding any clogging of the discharge port.

It is therefore a primary object of this invention to provide a device for controlling the discharge of granular material from a screw conveyor that will facilitate ease of adjustment under all operating conditions.

Another object of this invention is the provision of a screw conveyor discharge device that will not become clogged by large lumps of the conveyed material.

Figure 2:
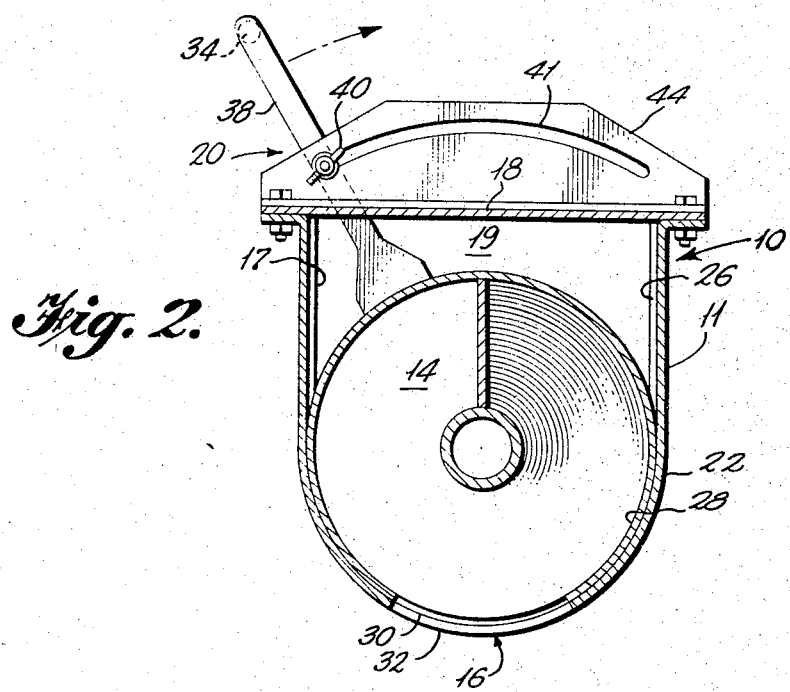

The above and more specific objects of the present invention will be appreciated by reference to the specific description of a preferred embodiment of the invention. It is to be understood that the illustrated and described embodiment is not to be considered as limiting the scope of the invention, but rather only as illustrative of a structure incorporating the principles of the invention. The preferred embodiment of the invention will best be understood by reference to the following drawings in which:

FIGURE 1 is a vertical side elevational view, partially in section, showing a portion of a screw conveyor incorporating the discharge device of the invention; and FIGURE 2 is a cross-sectional view taken on line 2—2 of FIGURE 1.

With reference to the drawings, the numeral 10 generally indicates a screw conveyor. The conveyor comprises an elongated conduit 11 which includes a case 12 and a housing member 22, to be described in detail hereinafter, in which a rotatable conveying screw 14 is mounted for conveying granular material along the passageway defined by the case 12. The screw 14 is rotated by suitable driving means, such as an electric motor and pulley arrangement (not shown), as is well known in the art. Granular material is introduced into a hopper (not shown) at the feed end of the conveyor to be transported through the case 12 and a portion thereof to be discharged from housing member 22 through port 16 into a bin or other storage container. The conveyor driving means and feed hopper form no part of the present invention.

Conveyor 10 is constructed in a manner that reduces friction due to the passage of granular material through the case. Such construction also obviates any binding of the screw 14 that could result from the packing and build-up of material in the case 12, such as might be caused by the ingestion of moist ungranulated lumps of the material. The lower portion 17 of the case 12 has a U-shaped cross-sectional configuration with an arcuate bottom which closely surrounds the lower half of screw 14. A case cover 18 is attached to the top of the vertical sides of U-shaped case portion 17, which sides extend above the upper periphery of screw 14 to provide an unoccupied longitudinal passageway 19, within case 12, between cover 18 and screw 14. Any lumps of moist material ingested within case 12 will be thrust to the surface of the moving stream of conveyed material by screw 14 into passageway 19, and thus will have no opportunity to pack against the case and bind the rotative movement of screw 14.

The device for controlling the discharge of material from the conveyor is designated generally by numeral 20. The device includes housing member 22 which extends between, and is affixed to, case sections 24 and 26. The housing member is U-shaped in cross-section and conforms with the curvature of lower case portion 17. Between case sections 24 and 26 a length of case portion 17 is cut away exposing a longitudinal section 27 of the screw, which section is covered by housing member 22. Positioned within the housing member, and extending longitudinally between the extremities of case sections 24 and 26, is a cylindrical sleeve 28, which as shown in the drawings, closely surrounds the periphery of longitudinal screw section 27 and comprises the closure member of the discharge device 20. Sleeve 28 is journaled for independent rotation about screw section 27 with respect to both the housing member 22 and the screw 14.

Formed in sleeve 28 and housing member 22 are respective identically sized discharge outlets 30 and 32. When sleeve 28 is rotated so that outlet 30 in the sleeve fully coincides with outlet 32 in the housing member, the discharge port 16 is fully open, as seen in FIG. 2.

Sleeve 28 is rotated by a handle 34 which is connected to the sleeve by arms 36 and 38 extending through elongated apertures in the case cover 18. The sleeve may be locked in any desired rotational position by locking mechanisms 40, which conveniently may be the bolts and wing nuts shown in the drawings. The locking mechanisms are fastened to arms 36 and 38, and slide in arcuate slots 41 formed in brackets 42 and 44 affixed to the top of cover 18. Thus, by securing the arms 36 and 38 to the brackets 42 and 44 respectively, by means of locking mechanisms 40, the sleeve 28 may be locked in a selected rotational position.

When locking mechanisms 40 are released and handle 34 is rotated in the clockwise direction, as shown by the arrow in FIG. 2, the sleeve 28 will be rotated about screw section 27, and outlet 30 thus rotated to a position adjacent the interior wall of housing member 22. At the same time, as sleeve 28 is turned in a clockwise direction the exterior wall of the sleeve will cover outlet 32 in the housing member, resulting in the full closure of discharge port 16.

When it is desired to discharge material from the conveyor, handle 34 is moved in the counterclockwise direction. As soon as the outlets 30 and 32 begin to coincide, material will begin to be discharged from the conveyor. Continued clockwise movement of handle 34 is maintained until the desired discharge rate has been achieved. At this point, locking mechanisms 40 will be used to secure arms 36 and 38 to brackets 42 and 44, thus locking the sleeve in the desired position.

The range of rotational movement of sleeve 28 is defined by the length of the arcs circumscribed by slots 41. The slots 41 are of sufficient length to permit rotation of sleeve 28 between the fully open position of port 16, as shown in FIG. 2, and the fully closed position of the port. As will be evident from this description, the rate of material discharge from the conveyor may be controlled to provide any desired rate between the fully closed and fully open positions of discharge port 16.

Since sleeve 28 is supported and positionally restrained only by the lower edges of case sections 24 and 26, the bottom portion of housing member 22 and arms 36 and 38, the sleeve will be partially floating on the conveyor screw 14 at all times. This floating action provides a self-cleaning feature, thus precluding deposits of material from building up on the surfaces of the sleeve and adjacent case sections, which would tend to corrode and freeze the sleeve in a fixed position.

As previously mentioned, most of the irregular sized lumps of material ingested into the conveyor will be moving through case 12 in passageway 19 at the top of the conveyed stream of regular sized, or granular, material. Therefore, substantially all of the lumps of material that enter sleeve 28 will be broken up against the inside upper wall of the sleeve by the rotating periphery of screw 14. However, should any small lumps actually enter the discharge port 16, they will immediately be ejected since the rotating periphery of screw 14 extends slightly into the port. This action is also an inherent result of the self-cleaning feature of the device deriving from the close proximity of the periphery of rotating screw 14 to the interior wall of sleeve 28 at all times.

If an exceptionally large quantity of material is introduced into case 12 at one time so as to completely cover screw 14, any lumps of material so included may move over sleeve 28 in the portion of passageway 19 defined between the outside upper surface of sleeve 28 and the inner surface of case cover 18, to be broken up at some discharge station further downstream. The passage of material between sleeve 28 and cover 18 will in no way interfere with the operation of discharge device 20 because the material entering this portion of passageway 19 will not be subjected to the direct driving impetus of screw 14, and thus will not be packed or wedged forcibly around the upper surface of the sleeve. Any material, including ungranulated lumps, that enters this portion of passageway 19 will be urged therethrough by the indirect driving action of additional material advancing from upstream which also overflows sleeve 28.

It should be noted that the device provides an extremely simple and efficient means for controlling the discharge of granular material from a screw conveyor and, in particular, the construction of the device facilitates ease of manual operation at all times.

Furthermore, a chute may be attached directly to the bottom portions of case sections 24 and 26, and housing member 22 for transferring the material from conveyor 10 to a vehicle or other apparatus, if the material is not to be discharged directly into a bin. The chute connection will not interfere with the operational effectiveness of discharge device 20 since the rotatable closure member, sleeve 28, is positioned inside conduit 11, with only the operating handle 34 extending from the upper side of case cover 18. Chute attachment is further facilitated by the configuration of housing member 22, which conforms with the-shaped curvature of lower conveyor case portion 17.

While the invention has beeen described in connection with a particular embodiment, it will be understood that it is not limited to the exact construction shown and described, but that various changes and modifications may be made without departing from the spirit and scope of the invention as defined in the appended claims.

What is claimed is:

1. A conveying apparatus which comprises:
   an elongated conduit having a U-shaped cross-sectional lower portion with an arcuate inner surface at the bottom thereof and a cover for said lower portion;
   said conduit including two longitudinal case sections in spaced end to end relationship and a housing member covering the space between said case sections, said housing member being affixed to the outer surfaces of said case sections adjacent said space;
   a rotatable screw positioned within said conduit for conveying material through said conduit, said rotatable screw being positioned within said conduit adjacent said arcuate surface such that said arcuate surface closely surrounds the lower periphery of said screw and a longitudinal passageway is defined between the upper periphery of said screw and said cover;
   a cylindrical sleeve closely surrounding the periphery of a longitudinal section of said screw and partially supported by said screw, said sleeve being positioned within said housing member between the extremities of said case sections and being journaled for rotation with respect to both said conduit and screw such that the lowermost portion of the inner surface of said sleeve remains contiguous to and longitudinally aligned with said arcuate surface;
   said sleeve and the bottom of said housing member each having a transverse opening therethrough, which openings may be aligned by rotation of said sleeve; and
   means for rotating said sleeve to selectively adjust the degree of alignment of said openings.

2. A conveying apparatus in accordance with claim 1 wherein the bottom of said housing member has an arcuate inner surface and said sleeve has an outer surface with the same curvature and in sliding contact with the bottom inner surface of said housing member.

3. A conveying apparatus in accordance with claim 2 including a bracket having an arcuate slot therein attached to the outer surface of said conduit adjacent said aperture, and locking means fastened to said arm and slidable within said slot for selectively securing said arm to said bracket and locking said sleeve and handle in any one of a plurality of rotational positions, said slot defining the degree of rotational movement of said sleeve.

4. A conveying apparatus in accordance with claim 3 wherein said conduit has a U-shaped cross-sectional lower portion and a cover enclosing said lower portion, said rotatable screw being positioned within said conduit adjacent the bottom inner surface of said U-shaped portion, and the upper periphery of said screw and the inner surface of said cover defines a longitudinal passageway through the upper part of said U-shaped portion above said screw.

5. A conveying apparatus in accordance with claim 4 wherein said means for rotating said sleeve comprises a manually operable handle connected to said sleeve by an arm extending through an elongated aperture through said conduit, and including means for locking said arm in any one of a plurality of rotational positions.

References Cited
UNITED STATES PATENTS

| | | | |
|---|---|---|---|
| 1,405,099 | 1/1922 | Cooke | 251—310 |
| 2,545,140 | 3/1951 | Escher | 198—1 |
| 3,025,945 | 3/1962 | Johanningmeier | 198—65 |
| 3,070,221 | 12/1962 | Bobrowski | 198—213 |
| 3,077,975 | 2/1963 | Hobbs | 198—205 |
| 3,231,071 | 1/1966 | Prentice | 198—64 |
| 3,236,173 | 2/1966 | Wohleb | 198—213 |

EVON C. BLUNK, *Primary Examiner.*

RICHARD E. AEGERTER, *Assistant Examiner.*